(12) United States Patent
Boulter

(10) Patent No.: US 6,771,288 B2
(45) Date of Patent: Aug. 3, 2004

(54) METHODS AND APPARATUS FOR UPDATING INFORMATION IN A DISPLAY CONTAINING FIXED AND VARIABLE INFORMATION

(75) Inventor: Brendan Boulter, Oranmore (IE)

(73) Assignee: 3Com Corporation, Santa Clara, CA (US)

( * ) Notice: Subject to any disclaimer, the term of this patent is extended or adjusted under 35 U.S.C. 154(b) by 473 days.

(21) Appl. No.: 09/802,257

(22) Filed: Mar. 8, 2001

(65) Prior Publication Data

US 2002/0075297 A1 Jun. 20, 2002

(30) Foreign Application Priority Data

Dec. 19, 2000 (GB) .............................................. 0030175

(51) Int. Cl.⁷ .............................................. G09G 13/00
(52) U.S. Cl. ..................... 345/736; 345/734; 709/204
(58) Field of Search ................................ 345/736, 734; 709/204

(56) References Cited

U.S. PATENT DOCUMENTS 5,907,681 A * 5/1999 Bates et al. .................. 709/228
5,913,920 A * 6/1999 Adams et al. ............... 709/204
5,929,855 A * 7/1999 Benton et al. ............... 345/736
5,978,807 A * 11/1999 Mano et al. .................. 707/10
5,983,231 A * 11/1999 Minatogawa et al. ....... 707/102
6,457,009 B1 * 9/2002 Bollay .......................... 707/10
6,499,054 B1 * 12/2002 Hesselink et al. .......... 709/204
6,505,247 B1 * 1/2003 Steger et al. ................ 709/224

FOREIGN PATENT DOCUMENTS

GB    2 369 911    6/2002

OTHER PUBLICATIONS

Flanagan, David, JavaScript, The Definitive Guide, O'Reilly, 3rd Edition, pp. 252, 253, and 622.*

* cited by examiner

Primary Examiner—John Cabeca
Assistant Examiner—Dennis Bonshock
(74) Attorney, Agent, or Firm—Michaelson & Associates; Peter L. Michaelson

(57) ABSTRACT

A computer manages a remote device via a remote monitoring system and a network. The computer employs a mimic that periodically displays status information transmitted from the monitoring system. Initially, the monitoring system transmits data that gives a complete description of the mimic, including information for variable and fixed images. When updating the mimic, the computer browses the monitoring system, which returns update data for updating the variable images only. The computer processes the received update data to determine which of the variable images needs to be updated. The computer retrieves new images only for those images that need to be updated. The new images are displayed while the remainder of the mimic is kept in its current state.

18 Claims, 6 Drawing Sheets

METHODS AND APPARATUS FOR UPDATING INFORMATION IN A DISPLAY CONTAINING FIXED AND VARIABLE INFORMATION

FIELD OF THE INVENTION

The present invention relates to methods and apparatus for displaying information and, more particularly, to methods and apparatus for efficiently displaying and updating information, e.g., device-status information, at a location which is remote from the source of the information.

BACKGROUND OF THE INVENTION

From a device or system management standpoint, it is often useful to know the status of one or more devices at any given time. In order to facilitate device and/or system management, monitoring devices are frequently used to collect device-status information. The collected information is then processed and, in many cases, transmitted to a physically remote management system for display to a human operator.

Displayed images that indicate the status of one or more corresponding physical or logical devices are sometimes referred to as device mimics. Device mimics may be implemented as a graphical representation of one or more devices and the status of the device(s). For example, a device mimic may be used to represent a network router and to display the status of various ports included in the network router.

The growing use of networked computers, i.e., intranets, and the growth of the now well known global Internet, provide a convenient infrastructure that can be used to transmit device-status information. Frequently, device-status information is transmitted using an intranet or the Internet to a management system so that it can be displayed to a human system administrator or other individual overseeing device and/or system operation.

Web browsers, such as Microsoft Corporation's Internet Explorer, offer a convenient way to access and display information via an intranet or the Internet. Web-browser-based management systems can be intuitive and easy to use. This makes them well suited for use by novice and non-expert users.

A typical Web browser enables a user to view, or "browse", documents located on the World Wide Web, another network, or a user's computer. Documents on the World Wide Web, called pages or Web pages, are normally written in HTML (hypertext markup language). A typical Web page comprises one or more HTML documents that enable a user to follow hyperlinks, transfer files, display graphics, play audio and video files, and execute small programs, such as Java applets, embedded in the HTML documents. Thus, Web browsers are commonly used to display images, including mimics, transmitted as part of a Web page.

As is known in the art, HTML documents contained in a Web page that represent a display are referred to as frames. Each frame generally comprises a rectangular section of a Web page that is a separate HTML document. Web pages usually have multiple frames, each of which is a separate HTML document. Each HTML document or frame typically contains HTML files that comprise image descriptions, image positioning information and instructions, e.g., routines for performing various operations. JavaScript routines may be included in these HTML files to perform various operations, including updating the visible contents of a frame that is displayed as part of a screen in which other frames are also displayed.

In browser-based management systems, mimics are sometimes implemented as HTML documents that include a full description of the device mimic to be displayed. Activation of a hypertext link is one method used to initiate downloading, e.g., updating, of displayed HTML documents.

In one known network management tool, a Web browser and a device mimic are used to display network device port status information to a user of a management system. In such a system, the device mimic is generated as part of a set of HTML documents that fully describe the device mimic. In addition to the device mimic, control information, e.g., optional commands, may be displayed. The device mimic is usually composed of a number of separate sub-images, some of which never change while others may change as a result of device-status update information.

In the known system discussed above, HTML documents representing a device mimic are regenerated each time the status information is to be updated, e.g., in response to manual activation of a refresh hyperlink. The updated HTML documents containing the description of the entire mimic is then transferred as a Web page from the monitoring device to the management system where the mimic is to be displayed.

Regenerating a new Web page with all of the necessary HTML documents needed to describe an entire mimic can entail significant device and network resources. The size of an HTML document representing an entire mimic may be significant, e.g., 30K bytes in some applications. It may take a monitoring device considerable time, e.g., 15 seconds of device processing time in some cases, to regenerate the HTML description of the entire mimic. The time needed to generate the HTML documents is in addition to the amount of time and network resources required to transmit the Web page containing the mimic from the monitoring device to the management system. These overheads are incurred regardless of the amount, if any, of a device's changes in status.

Thus, to conserve network, monitoring device, and/or management system resources, mimic updating techniques of the type described above tend to find limited application in known monitoring systems. For example, device-status updates may be limited to points in time when a human operator of the management system that displays the mimic manually initiates a screen refresh by activating a refresh hyperlink, for example, by double clicking on a displayed text or an icon representing the hyperlink.

When mimics, of the type discussed above, are initially generated or regenerated, the mimic accurately reflects the status of the device to which it corresponds. However as a result of the limited number of updates, the displayed mimic can lose synchronization with the device over time due to changes in device status. This is because changes that occur between the generation or regeneration of HTML documents used to implement the mimics will not be reflected in the displayed mimic until the refresh occurs.

Unfortunately, users of such management systems often are not certain when the mimic needs to be updated, e.g., due to the monitored device changing status. In addition, the amount of time required to refresh the screen can be frustrating to users. Thus, the time required to refresh a device mimic may act as a deterrent to a user refreshing the mimic. As a result users may rely upon mimics that inaccurately display network device-status information.

In view of the above, it is apparent that there is a need for new and improved methods and apparatus for implementing device mimics. It is desirable that at least some of the new methods be capable of updating device-status information included in a mimic without having to generate all of the HTML documents representing the entire mimic. It is also desirable that device-status updates occur without the need for a user to request that the displayed mimic be updated or refreshed. It is also desirable that device-status information be updated when a change in device status is detected or at least on a periodic basis so that the device-status information in a mimic be reasonably current.

SUMMARY OF THE INVENTION

The present invention relates to methods and apparatus for efficiently displaying and updating information, e.g., device-status information, at a location which is remote from the source of the information.

Specifically, the invention includes methods and apparatus for efficiently generating and updating screens representing device-status information. A management system that includes a Web browser is used to display device-status information transmitted to the management station in the form of an HTML file. The initial HTML file includes a complete description of the status screen to be displayed. Rather than generate and transmit a complete description of the status screen to the management station each time device status changes, a set of device state information in the form of an HTML file is transmitted, e.g., from a remotely located device monitor to the management system.

A program, e.g., a JavaScript routine, is used to update the displayed status information based on the received device state information. Use of a JavaScript routine allows portions of the displayed screen to be modified without having to alter or regenerate the fixed portions of the displayed status screen or the portions relating to device-status information which have not changed. Because device state information is transmitted to update the displayed status information, as opposed to an HTML description of the entire device-status screen, the updating of device-status information is relatively efficient and can be done periodically or whenever a change in device status is detected.

In accordance with the present invention, an image indicating status of a logical or physical device is displayed, e.g., on a computer screen. The displayed status information may be part of a device mimic which graphically represents a device and its status.

Additional features of the present invention are discussed in the detailed description which follows.

BRIEF DESCRIPTION OF THE DRAWINGS

The teachings of the present invention can be readily understood by considering the following detailed description in conjunction with the accompanying drawings, in which.

To facilitate understanding, the same reference numbers have been used in the figures, where possible, to refer to elements which are the same as, or similar to, one another.

DETAILED DESCRIPTION

As discussed above, device mimics are displayed images that can indicate the status of one or more corresponding physical or logical devices. By using a device mimic, a user is presented with a graphical representation of a device that can be used to display device status in an intuitive format. In accordance with the present invention, display updates are depicted in the mimic upon detection of a change in device status or at periodic, e.g., pre-selected, intervals. By selecting the interval between device updates to be small, a change in device status is illustrated soon after it occurs. Display updates are accomplished in accordance with the present invention by changing those portions of the mimic display that correspond to a device having a status that changed since the last update. The other portions of the display are usually left unaltered.

The present invention takes advantage of the fact that status sub-images that relate to device characteristics that have not changed their status since the last update, as well as fixed sub-images, need not be updated. One embodiment of the present invention involves monitoring the status of one or more physically remote devices from a management system including, e.g., a computer and a display device. In the exemplary embodiment, the management system is coupled to a monitoring system via the Internet and/or an intranet. In the exemplary embodiment, the monitored device is a network device, e.g., router. Though this exemplary embodiment is used to display information relating to a network device, it is envisioned that the device mimic described herein may be applied to display the status of any type of monitored device whether it be a logical or physical device.

Figure 1:
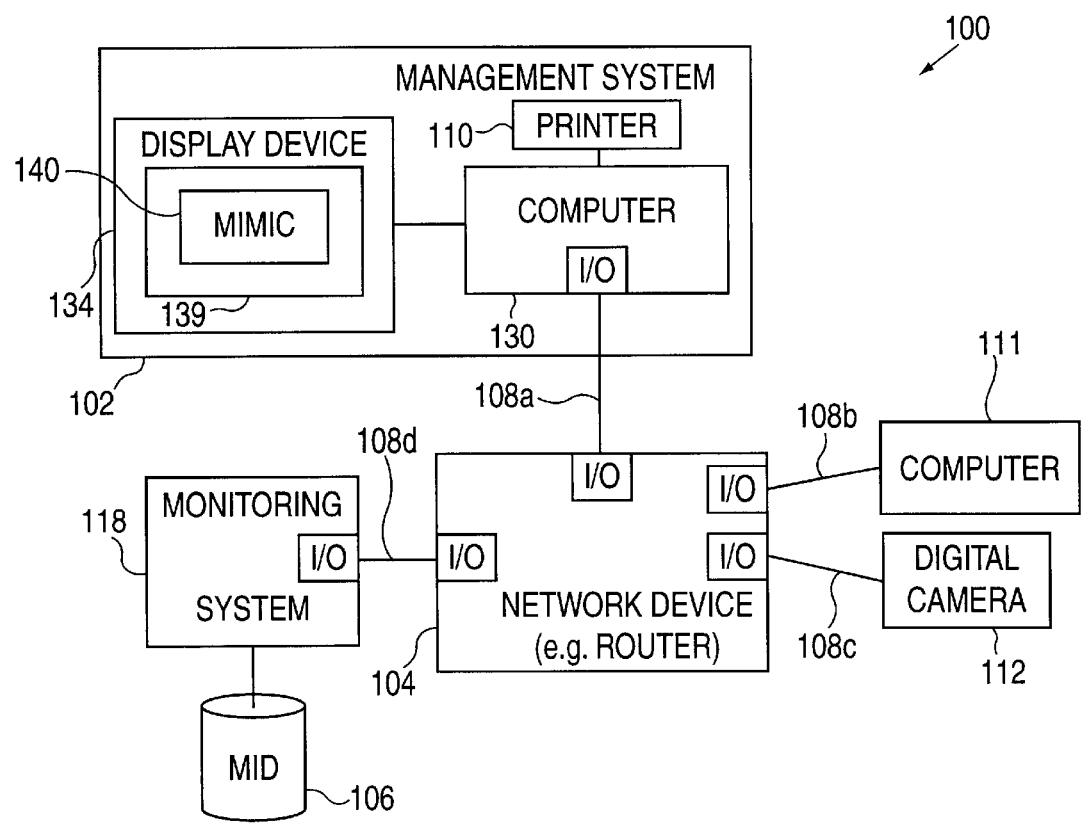
FIG. 1 depicts an overall high-level block diagram of one embodiment of the invention that displays status of a network device using a computer.

FIG. 1 illustrates system 100 implemented in accordance with the present invention. As illustrated, system 100 comprises management system 102, monitoring system 118, network device 104, e.g., a router, computer 111, digital camera 112, for creating graphical data, and an information database, e.g., management information database (MID) 106. Management system 102, computer 111, digital camera 112 and monitoring system 118 are coupled to network device 104 via network connections 108a, 108b, 108c, and 108d, respectively. Network device 104 and network connections 108a–108d may comprise part of an intranet or the Internet.

MID 106, which couples to monitoring system 118, includes device-status information, such as port-status information about network device 104. Monitoring system 118, network device 104, and management system 102 each include input/output (I/O) ports used for interfacing with network connections 108a–108d.

Management system 102 includes computer 130 for performing various operations in response to routines, data, and information stored within computer 130 that relate to system management functions. Management system 102 also includes display device 134 and printer 110. Various functions of computer 130 relate to the generation and updating of device mimic 140 which is displayed as part of Web browser screen 139. Computer 130 displays Web browser screen 139 and mimic 140 on display device 134.

Monitoring system 118 is responsible for monitoring the status of network device 104 and the status of various other devices included in system 100, e.g., computer 111 and digital camera 112. A particular implementation may include monitoring system 118 as part of network device 104. Network device 104 maintains and uses the information contained in MID 106 to provide status-update information and initial-device mimic description files to management system 102.

For purposes of explanation, network device 104, which may be, e.g., a router, bridge, switch, repeater, hub, or any other similar type of device that transmits digital information or data between locations based on routing information, will be used as an exemplary monitored device.

Figure 2:
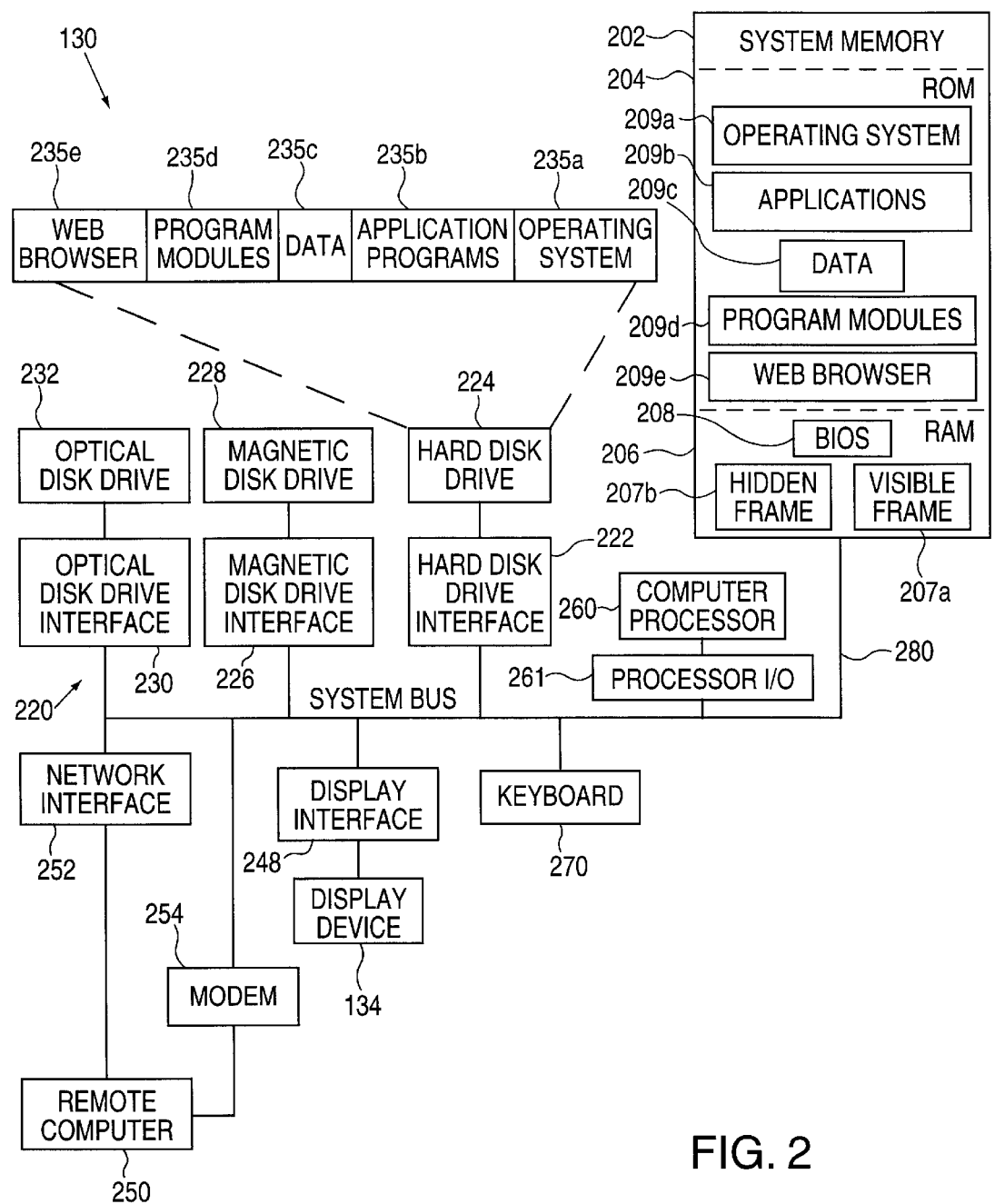
FIG. 2 depicts a block diagram illustrating internal components contained within computer 111 of FIG. 1.

Display device 134, which forms part of management system 102, may be of any type including, but not limited to, a cathode ray tube display or a light emitting diode ("LED") display. The internal structure of the computer 130 is illustrated in FIG. 2. FIG. 1 depicts mimic 140 being displayed on display 134. Mimic 140 may be the same as, or similar to, the mimics shown in FIGS. 3 and 4. The manner in which mimic 140 is generated and refreshed by computer 130 in accordance with the present invention will be discussed below in detail with respect to FIGS. 5 and 6.

Figure 3:
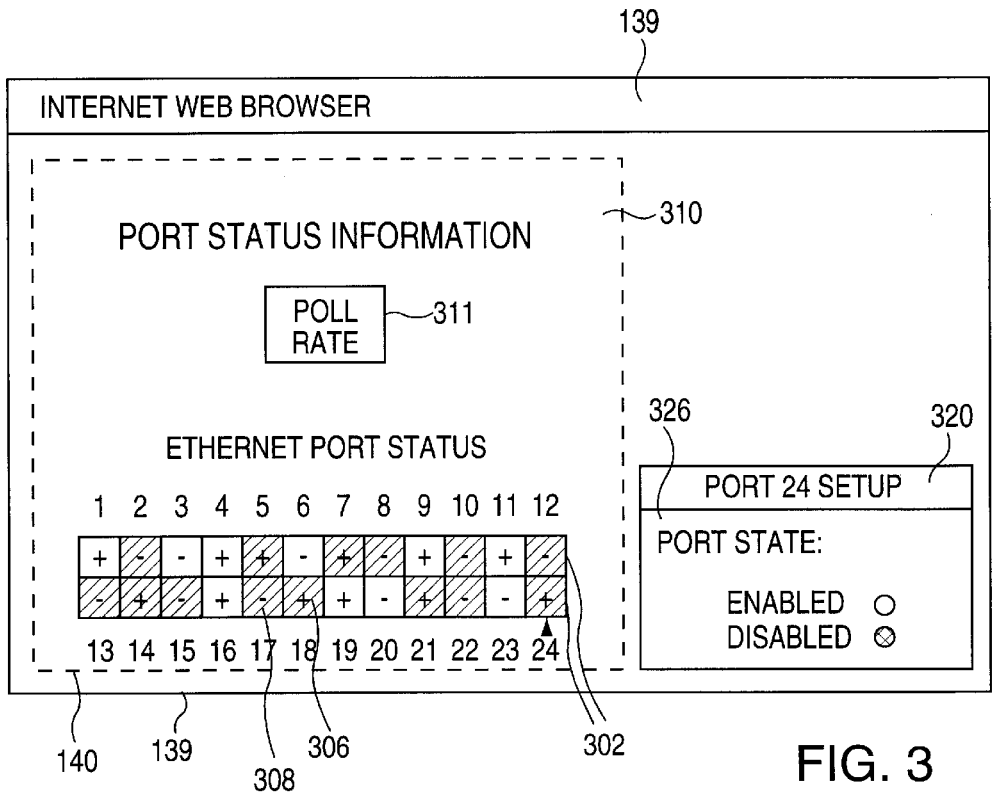
FIG. 3 depicts a screen displaying device-status information in accordance with one embodiment of the present invention.
Figure 4:
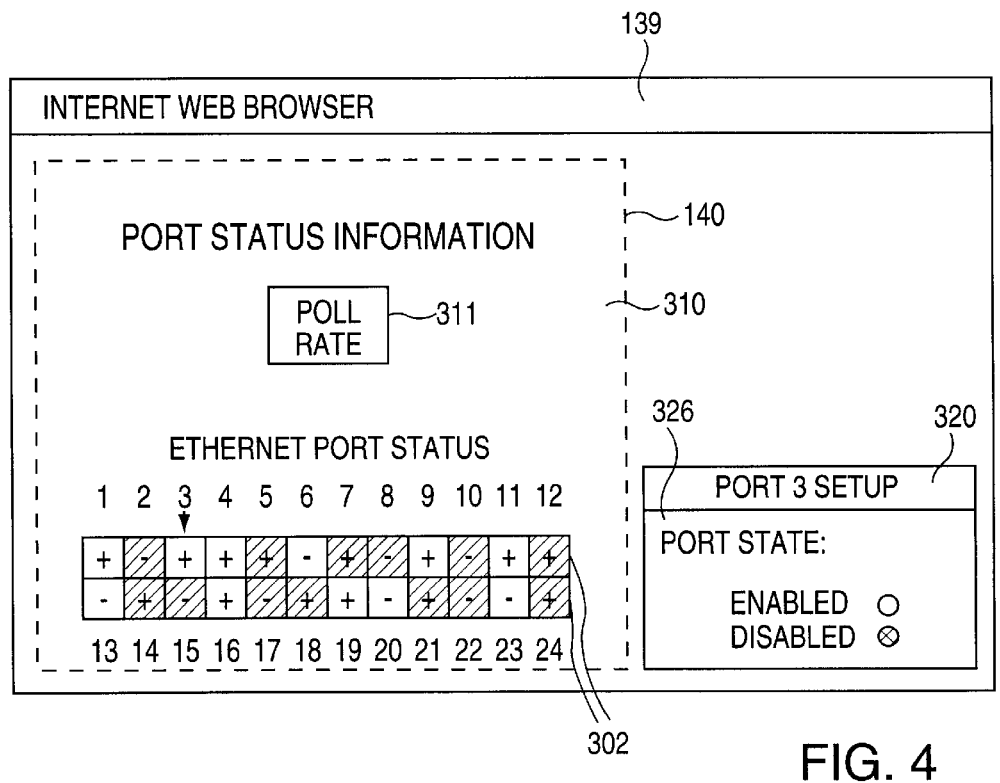
FIG. 4 depicts the FIG. 3 device-status display after a plurality of status sub-images has been updated.

FIG. 2 depicts an exemplary embodiment of those components associated with computer 130 for displaying a mimic 140, e.g., of the type depicted in FIGS. 3 and 4, on the display 134. Computer 130 may comprise a personal computer (PC), a workstation, a server, a mainframe computer, or any other type of computer.

System memory 202, included within computer 130, comprises read only memory (ROM) 204 and random access memory (RAM) 206. RAM 206 includes basic input/output system (BIOS) 208, which contains basic routines to transfer information between the elements within computer 130, such as during start-up. RAM 206 also includes an HTML document that includes visible frame 207*a* and hidden frame 207*b*. ROM 204 may include operating system 209*a*, applications 209*b*, data 209*c*, other program modules 209*d*, and Web browser 209*e*.

Computer 130 further includes drive portion 220, comprising hard disk drive interface 222, hard disk drive 224, magnetic disk drive interface 226, magnetic disk drive 228, optical disk drive interface 230, and optical disk drive 232. Magnetic disk drive 228 writes to or reads from a (e.g., removable) magnetic disk (not shown). Optical disk drive 232 reads from or writes to a removable optical disk (not shown) such as a compact disk or a digital video disk (DVD). Hard disk drive 224, magnetic disk drive 228, and optical disk drive 232 are coupled to system bus 280 by hard disk drive interface 222, magnetic disk drive interface 226, and optical drive interface 230, respectively. The drives and their associated storage media may provide non-volatile storage of machine readable instructions, data structures, program modules, and other information that may be utilized by computer 130.

Some contents, such as operating system 209*a*, which may be stored in hard disk drive 224, may be written into ROM 204 during initial startup of computer 130. Some contents of hard disk drive 224, i.e., applications, may be written into corresponding locations in ROM 204 or RAM 206 as a result of user input of computer 130. Thus, hard disk drive 224 (and its associated hard disk) may comprise the following copies: operating system 235*a*, application programs 235*b*, data 235*c*, program modules 235*d*, and Web browser 235*e*. Copies in the hard disk drive correspond to locations in ROM 204. Since the access space of the hard disk drive 224 is considerably larger than that of ROM 204, only some of the data and programs contained in hard disk drive 224 may be stored in ROM 204 at any given time. Though FIG. 2 depicts a hard disk drive, a removable magnetic disk drive, and an optical disk drive, those skilled in the art will appreciate that other types of storage media may be used. These other types of storage media include, but are not limited to magnetic cassettes, flash memory cards, digital video disks, Bernouli cartridges, other types of RAM, and other types of ROM. In addition, a number of program modules may be stored on the hard disk, magnetic disk, optical disk, ROM, or RAM, such as an operating system, one or more application program, display driver, printer driver, and program data, for example.

A user may enter commands and information into personal computer 130 through input devices, such as keyboard 270, or a mouse, a joystick, or a microphone (not shown). Output devices, such as display 134, display data output from computer 130. Display device 134 connects to computer 130 via display interface 248 and system bus 280.

Computer 130 may operate in a networked environment, defined by logical connections between one or more remote computers, such as the management system 102 or an additional computer depicted in FIG. 2 as remote computer 250. The connections depicted in FIG. 2 are intended to comprise local area network (LAN), wide area network WAN, intranet, Internet, and/or ISDN configurations. Remote computer 250 may be a PC, a server, a router, a network PC, or other common network node, or any other known computer. Remote computer 250 may include many or all of the elements described above relative to computer 130. When used in a LAN, computer 250 may be connected to the LAN through network interface adapter 252. Computer 130 may be connected to the remote computer 250 via modem 254 when used in a WAN, such as the Internet. Modem 240, which may be internal or external to computer 130, may connect to system bus 280 via a serial port interface (not shown). In a networked environment, some of the program modules depicted relative to computer 130 may be stored in a remote memory storage device. The network connections shown are exemplary and other means of establishing a communications link between the computers may be used.

Computer 130 comprises computer processor 260 that controls operation of computer 130 through data communications via processor I/O 261 to and from the associated elements over system bus 280. Operations of processors are well known, and will not be further detailed herein.

In a preferred embodiment, a mimic is described to Web browser 209*e* as an HTML document that includes a JavaScript routine as described below in detail. In order to facilitate the implementation of mimics to a range of devices, a device mimic is typically composed of a plurality of separate sub-images. For instance, one embodiment of mimic 140 is illustrated in FIGS. 3 and 4, as it appears on display 134.

A mimic is usually formed from many different sub-images. The different sub-images may be classified as either fixed (invariant) or status (variant). Each status sub-image may indicate the status of a particular device status, say the statuses of port connections in the present example. A mimic usually comprises a variety of different status sub-images and fixed sub-images. Since a device status may vary during normal device operation, a mimic displaying corresponding status sub-images should be altered as quickly as practicable. For example, a status sub-image may illustrate one particular Ethernet port status. If there are twenty-four Ethernet ports in a specific device, correspondingly, there might be twenty-four Ethernet status sub-images. The same sub-image may be reused to generate each of the 24 status sub-images. Other status sub-images may include console port sub-images, data transfer rate of a port, etc.

Fixed, or invariant, sub-images do not need to be updated, since they represent a characteristic of the device that does not change over time with normal device operation. Fixed sub-images may be used to make the graphical representation of a mimic to a user. Examples of fixed sub-images may include sub-image panels simulating device panels on a monitored device, advertising logos, and number sub-images corresponding to specific status sub-images.

In FIGS. 3 and 4, examples of fixed sub-images include the permanent labels: "PORT STATUS INFORMATION" and "ETHERNET PORT STATUS." Each of these fixed sub-images appears unchanged in mimic 140 regardless of updates. Panel 310 in mimic 140 defines a large pixel area that remains constant regardless of status changes in monitored network device 104. In addition, numerals "1" to "24", which identify the associated Ethernet port status sub-images, also do not change during the updating of mimic 140, and thus are fixed sub-images. In addition, panel 310 in mimic 140 includes user activated poll-rate sub-image 311. By clicking on poll-rate sub-image 311 a user can input a particular polling rate and, therefore, change the rate at which the Ethernet port statuses are polled and sub-images 302 are refreshed.

Thus, a large portion of mimic 140 is formed from fixed sub-images. As such, a considerable amount of processing and refreshing time may be saved in accordance with the present invention by refreshing only portions of mimic 140 that represent the status sub-images corresponding to device characteristics that have a changed status since the last update, as opposed to regenerating the entire contents of mimic 140. To render the refreshing of mimic 140 during status updates as quick and responsive as possible, it is desirable to limit the number of, and area of, status sub-images as much as practical. Limiting the refreshing to only those status sub-images corresponding to device states that have changed since the last update is also desirable.

Status sub-images in FIGS. 3 and 4 include twenty-four bi-functional Ethernet port status sub-images 302. Each Ethernet port sub-image 302 includes two status sub-image portions: a sign sub-image portion 306 and a color (striped) sub-image portion 308. The sign sub-image portion 306 and the color sub-image portion 308 function in the same manner for each Ethernet port sub-image 302.

Color sub-image portion 308 takes on one of two color values represented herein by the presence or absence of striping. Color sub-image portions 308 indicate whether the associated Ethernet port is enabled or not. In FIGS. 3 and 4, a dark color, e.g., striped, in sub-image portion 308 indicates that the associated Ethernet port is not enabled, while a light color, e.g., non-striped, in sub-image portion 308 indicates that the associated Ethernet port is enabled. In FIG. 3, for example, the dark-colored (striped) sub-image portion 308 numbered "13" corresponds to a device port that is not enabled. In FIG. 4, the color sub-image numbered "13" corresponds to a device port that is enabled.

In FIGS. 3–4, sign sub-image portions 306 represent device state information, which indicates whether or not a link is connected to the corresponding port. A positive sign (+) in the sign sub-image portion 306 indicates that a link is connected to the corresponding device port; a negative sign (−) in the sign sub-image portion 306 indicates that no link is connected to the corresponding device port. In FIG. 3, for example, the sign sub-image for Ethernet port 12 is a "−" indicating that no link is connected to the corresponding device port. In FIG. 4, the sign sub-image for Ethernet port 12 is a "+" indicating that a link is connected to the corresponding device port. A console port sub-image (not shown) may similarly indicate whether a corresponding device console port is active or not. Accordingly, through the use of one of two color values (striping) and the use of either the "+" or "−" symbol, mimic 140 indicates the state of each port.

The sign sub-image portion 306 and the color sub-image portion 308, as depicted in FIGS. 3–4, are illustrative and are not intended to be limiting in scope. For instance, sub-images appearing to be a link plugged into a port could indicate a link state, e.g., whether or not the link is connected to a port in the corresponding monitored device. A checkmark sub-image could indicate an active port in the corresponding monitored device. In addition, a port may be represented by two distinct sub-images, e.g., a first sub-image may indicate a link connected to the port and a second light may indicate that the port is active. The first sub-image might be on when the corresponding device port is active and off when the corresponding device port is inactive. The second sub-image might be on when a link is connected to the corresponding device port and off when no link is connected to the corresponding device port. Any readily comprehensible mimic sub-image convention is within the scope of the present invention.

Mimic 140, as illustrated in FIGS. 3–4, provides status information relating to the monitored network device 104. Web browser screen 139 includes additional images and information that may be used to control the device. Port setup portion 320 displays port status control sub-image 326, which a user can activate to control network device 104. A user can manually enable or disable a particular Ethernet port in network device 104 by, e.g., clicking on a corresponding button at the bottom of port setup portion 320. In response, Web browser 209e transmits a request to network device 104, which computer 111 executes, causing command data corresponding to the action suggested by the activated button in port setup portion 320 to be transmitted from monitoring system 118 to the monitored network device 104 via network connection 108d. When command data are received by the monitored network device 104, a processor portion of network device 104 processes the command data and responds by changing the state of the monitored network device 104. A change in status of network device 104 is reflected by a change in a corresponding mimic sub-image 302 during the next update of sub-images 302. Other device states of the monitored network device 104 may also be interactively controlled via management system 102.

In the known prior art discussed above, a full mimic description is used to generate each new mimic, which entirely replaces a previously displayed mimic. As discussed above, the periodic generation of entire mimics to replace similar mimics usually places considerable processing demands on a monitoring system. In addition, transmitting an entire mimic description each time a mimic is to be updated can place considerable demands on such network resources as bandwidth.

In accordance with the present invention, mimic updates are accomplished by generating, transmitting, and using sets of HTML files that contain device state information, e.g., represented as a set of encoded values, as opposed to transmitting a description of an entire mimic. Such mimic update files may be hidden files, i.e., files the contents of which are not rendered directly visible to a user of the management system.

The present invention also contemplates that mimic sub-images automatically update as a device status changes or at set periodic intervals without the need for intervention by a user of the management system. In accordance with the present invention, an HTML description of an entire mimic, including all of the status sub-images and all of the fixed sub-images, need only be generated at startup. Thus, the fixed sub-images and the status sub-images (which may subsequently be changed) are generated to form the complete mimic image at startup.

Detected changes in the status, e.g., state, of a monitored device, for example, if an active port becomes inactive or if a new link is connected to a port, are transmitted from a monitor to a management system using a relatively simple encoding scheme. The encoded state information is included in an HTML file that is transmitted to a management system. The HTML file containing the device state information will usually be substantially smaller than the HTML documents needed to describe a typical mimic, e.g., less than one-twentieth or one-hundredth the size of a full mimic description. Use of this mimic update approach can greatly reduce the amount of network traffic associated with mimic updates. The method of the present invention also reduces the computational burden on a typical monitoring system.

The state information files, e.g., hidden HTML files (sometimes called hidden frames), representing status updates are received by a Web browser. The hidden HTML files containing device state information normally include JavaScript commands that initiate a mimic update operation. The mimic update operation may be implemented using a separate update routine included as part of the full device mimic description file used to create an original mimic. An update routine compares each new status, e.g., state, value included in the received update state information with an existing status value associated or used to generate the existing mimic. If any new status value differs from a corresponding existing status value, the computer replaces the sub-image present in a mimic by a sub-image that accurately reflects the present state of the monitored devices or device. If no change in the state of the device is detected, the mimic is left unaltered.

It is further noted that in a preferred embodiment, a management system and a monitoring device may be physically remote from each other. In addition, a monitored device may be physically remote from a monitoring system.

Some of the various functions of the present technique may be summarized as follows:

a. Tagging sub-images of a device mimic as either status sub-images, which can change, or fixed sub-images, which do not change. Normally, status sub-images may be used to illustrate device state information.

b. Generating status update files including device state information. This function does not require generating a full HTML description of a mimic, and instead relies upon a simple encoding (discussed below) of device state or device-status information into a set of device state information which are included in a status update file.

c. Processing of an encoded status or state information by a management system to detect changes in device states.

d. Executing a JavaScript routine to allow sub-image replacement techniques to update portions of a mimic without having to regenerate an entire mimic.

Figure 5:
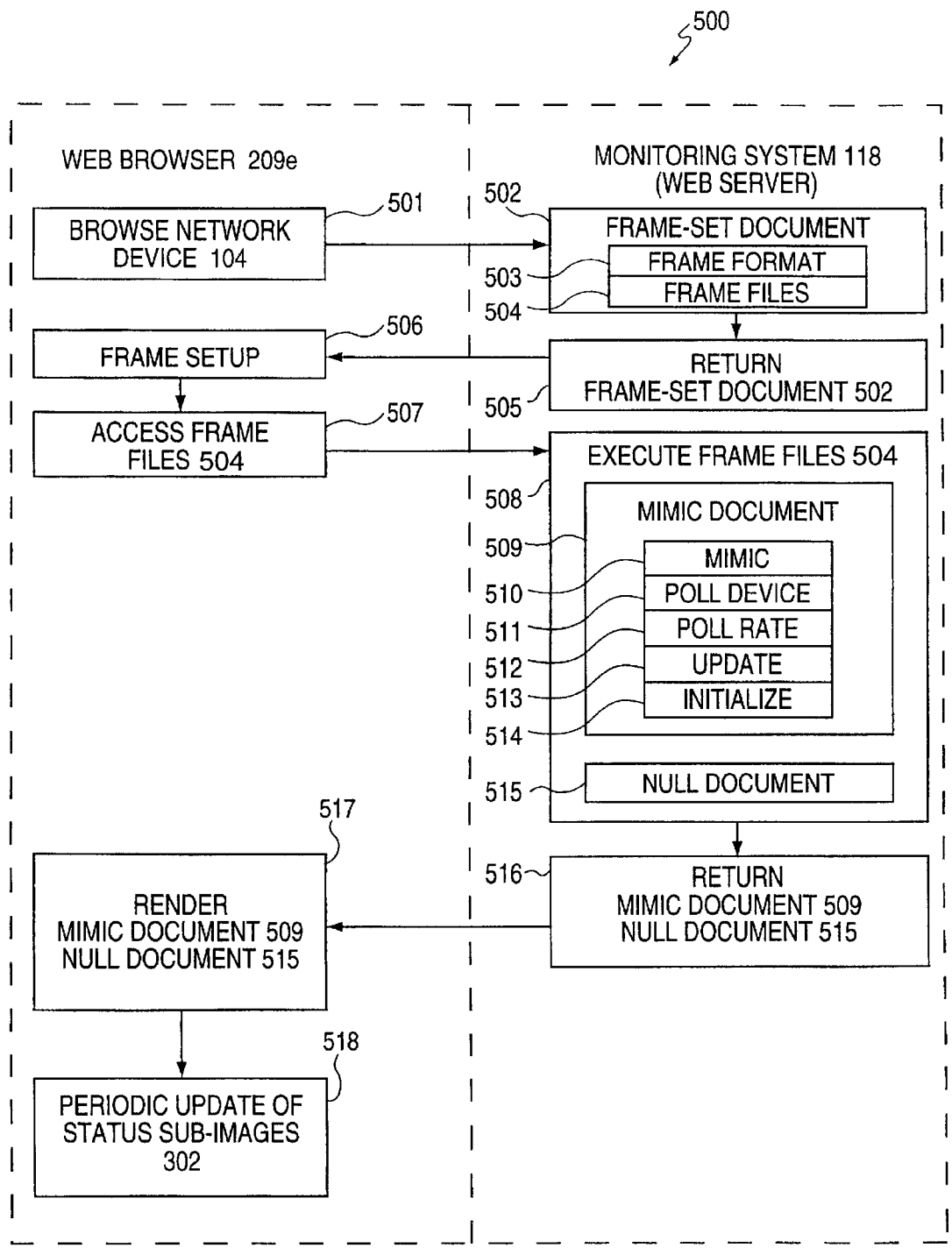
FIG. 5 depicts a high-level flow diagram illustrating a mimic monitoring process in accordance with the present invention.
Figure 6:
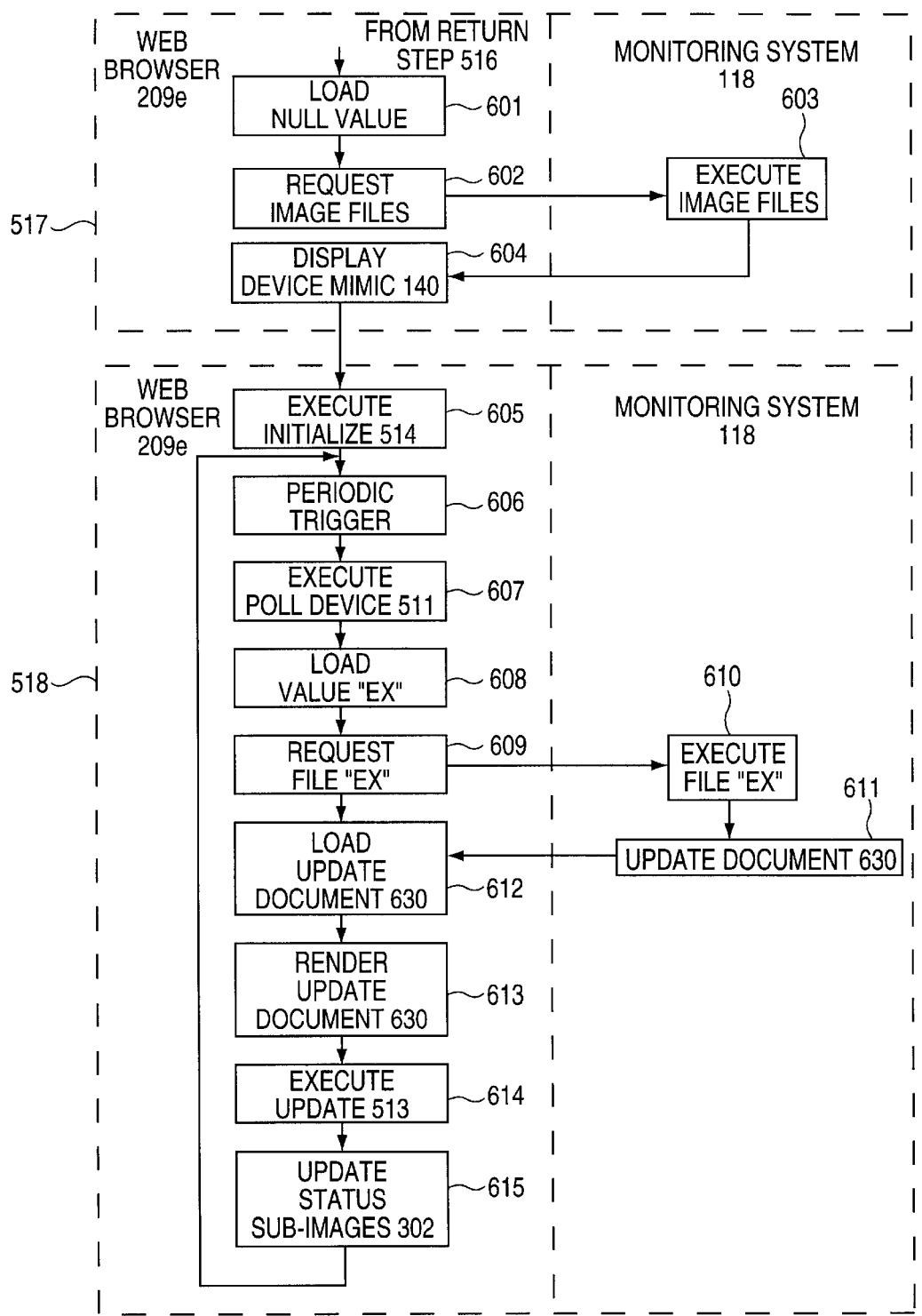
FIG. 6 depicts a high-level flow diagram illustrating a portion of the mimic monitoring process of FIG. 5.
Figure 7:
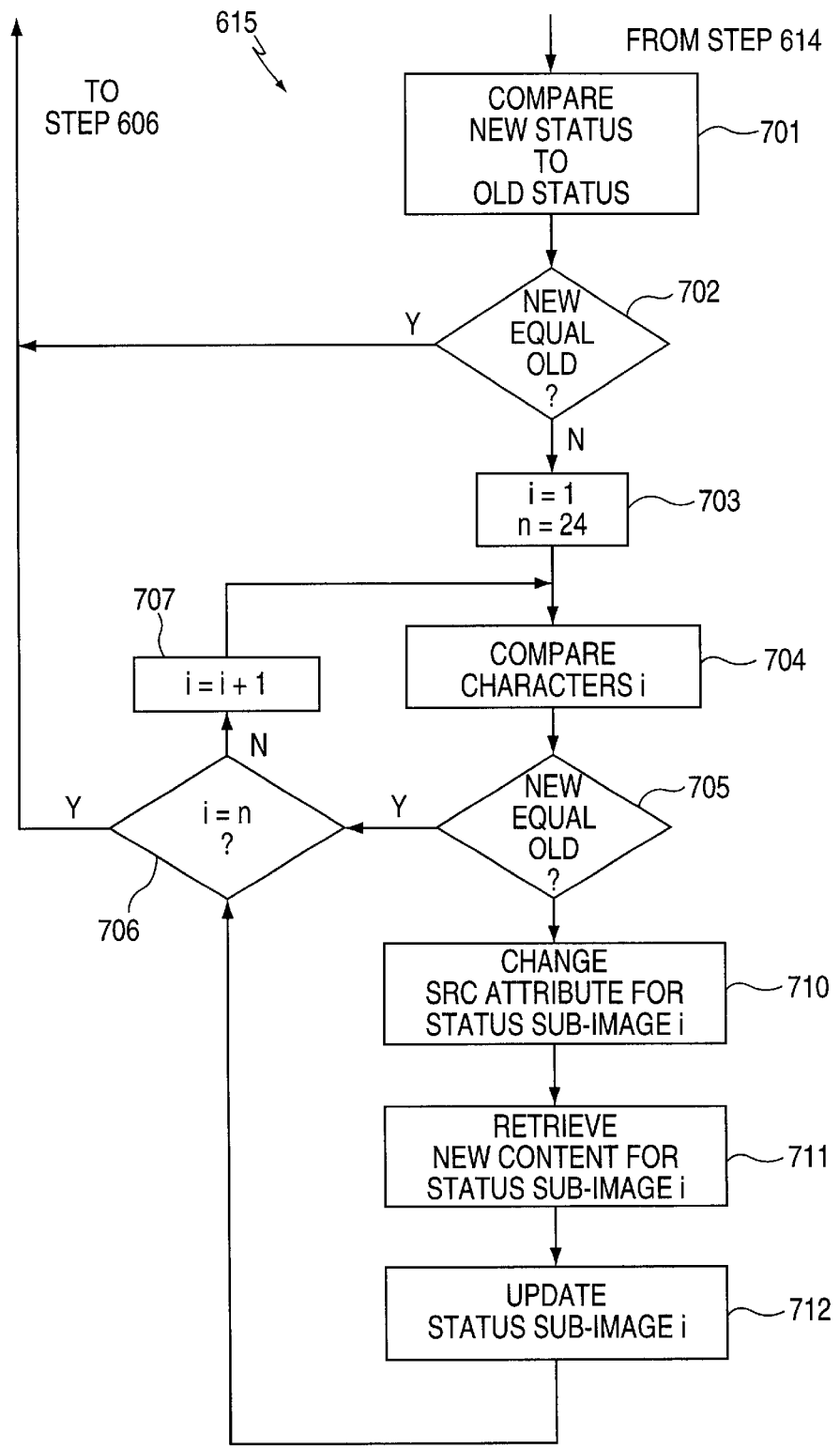
FIG. 7 depicts a high-level flow diagram illustrating a portion of the process of FIG. 6.

FIGS. 5–7 depict mimic monitoring process 500 in accordance with the present invention. In FIG. 5, Web browser 209e (see FIG. 2) performs a portion of process 500 (shown in the left side), while remote-monitoring system 118 (see FIG. 1) performs the steps located in the right side. In general, when a Web browser, e.g., Web browser 209e, accesses an executable file, commonly known as a server script, from a Web server, e.g., monitoring system 118, the Web server executes the file program and returns its output to the Web browser. Upon executing a file program, the Web server usually formats the output as an HTML document, commonly known as a script document.

Process 500 begins with browse STEP 501, wherein a user of management system 102 initially activates Web browser 209e (see FIG. 2) to "browse" into network device 104 (see FIG. 1) for remote-monitoring purposes via the Internet. In response, monitoring system 118, which functions as a Web server, fetches frame-set document 502 from MID 106 and, via return STEP 505, transmits frame-set document 502, typically an HTML document, to Web browser 209e.

Frame-set document 502 includes frame-format data 503 and frame-files data 504. Frame-format data 503 includes frame instructions that describe how Web browser 209e should divide screen 139 (see FIGS. 3–4) into several rectangular regions, commonly known as frames. Frame-files data 504 specifies the names and locations of executable frame files 524 located at monitoring system 118 that are capable of outputting HTML documents to be loaded into particular frames. Thus, while frame-set document 502 controls the number and size of the frames of mimic 140, it also informs Web browser 209e where to obtain the contents of each of these frames.

In particular, frame-set document 502 divides Web browser screen 139 into visible frame 207a, and an invisible or hidden frame 207b (see FIG. 3). While the contents of hidden frame 207b are not visible in Web browser screen 139 (see FIGS. 3 and 4), the head of hidden frame 207b can contain data. In addition, frame-set document 502 may define other conventional frames, such as a second visible frame that holds port setup portion 320 (see FIGS. 3–4). Details related to the processing and displaying of port setup portion 320 and other conventional frames are well known and, therefore, are not described further.

Thus, upon receiving frame-set document 502, Web browser 209e performs frame-setup STEP 506. In frame-setup STEP 506, Web browser 209e initializes frames 207a and 207b, and allocates a specific graphic area in Web browser screen 139 to be associated with visible frame 207a. As described above, web browser 209e will allocate no graphic area for hidden frame 207b because there is nothing to display.

In access STEP 507, Web browser 209e essentially requests that monitoring system 118 execute, via execute STEP 508, frame files 504 and return specific frame-files data as, for example, a set of HTML documents. One such HTML document outputted by an execution of frame-files 504 is mimic document 509, which is loaded into visible frame 207a. Specifically, when executing frame files 504 in execute STEP 508, a server script located in monitoring system 118 generates mimic document 509, which includes mimic description data 510 in the form of an HTML description of network device 104. Mimic document 509 also includes the following JavaScript functions: poll-device function 511, poll-rate function 512, update function 513 and initialize function 514. Finally, the execution of frame-files 504 also produces null document 515.

Monitoring system 118 returns mimic document 509 and null document 515 in return STEP 516. Null document 515, an HTML document with a null body, contains files to be loaded into the head of hidden frame 207b. It is noted that the use of null document 515 and, therefore, hidden frame 207b is necessary to avoid potential sequencing errors. As will become apparent below, precise sequencing will ensure that mimic updates are not requested until after a mimic has been fully retrieved. After receiving mimic document 509 and null document 515, Web browser 209e next renders these documents to produce device mimic 140, via render STEP 517. At this time, Web browser 209e displays an image of device mimic 140 that is similar to the image depicted in FIG. 3. However, at this point, monitoring system 118 has not yet informed Web browser 209e what the specific statuses are of the Ethernet ports of network device 104. Thus, status sub-image 302 will not yet contain color sub-image portions 308 and sign sub-image portions 306. Instead, status sub-image 302 could contain a set of twenty-four gray boxes. After rendering documents 509 and 515 in render STEP 517, Web browser 209e performs periodic updates of the status-sub-images 302 in update STEP 518.

FIGS. 6 and 7 show the details of render STEP 517 and update STEP 518. In FIG. 6, Web browser 209e performs the steps contained in the left side, while monitoring system 118 performs the steps located in the right side. The first step is to render null document 515, which is trivial. Since frame 207b is invisible, there will be no place to display data from null document 515. As such, null document 515 will have nothing to display and, therefore, will have no body. On the other hand, the head of null document 515 will contain a null value that Web browser 209e loads into the head of hidden frame 207b, via load STEP 601.

Next, Web browser 209e renders mimic document 509. The body of mimic document 509 contains references to a number of images that Web browser 209e automatically requests from monitoring system 118 as a result of rendering mimic document 509. These images relate to the many fixed and changeable sub-images appearing in panel 310 of device mimic 140 (see FIGS. 3 and 4). Thus, the process of rendering mimic document 509 includes the act of requesting these images from monitoring system 118, via request STEP 602. In response, monitoring system 118 performs execute STEP 603, which involves executing the requested image files to produce a set of image documents that monitoring system 118 returns to Web browser 209e. Web browser 209e loads these documents into the body of mimic document 509. Using the received image documents, Web browser 209e displays device mimic 140, in display STEP 604.

After Web browser 209e displays device mimic 140, a script engine in Web browser 209e executes initialize function 514 via execute STEP 605. This causes poll device function 511 to periodically execute via periodic-trigger STEP 606. In the present example, an updating or polling period might be, for example, a thirty-second period, meaning that management system 102 would be polled to update the status of status sub-images 302 in mimic 140 every thirty seconds.

In response to the execution of poll-device function 511, via execute STEP 607, Web browser 209e begins the process of retrieving the status of network device 104 from monitoring system 118. Initially, Web browser 209e loads into the head of hidden frame 207b the name of a predetermined executable file located in MID 106 that, when executed, will retrieve and return the current status of network device 104. In the present example, the value "EX" represents the name of that predetermined executable file located in MID 106. Thus, in load STEP 608, Web browser 209e loads the value "EX" in the head of hidden frame 207b causing the null value to change to the value "EX." Web browser 209e, responding to load STEP 608, than performs request STEP 609, which involves sending a message to monitoring system 118 to retrieve and execute file "EX." Upon receiving the request, monitoring system 118 performs execute STEP 610, which involves executing file "EX," thereby obtaining the most-recent status of network device 104. For instance, in execute STEP 610, a JavaScript program that is part of file "EX" obtains the appropriate statuses of the twenty-four ports of network device 104. That JavaScript program could do this by several means, including accessing a status look-up table stored in MID 106. In this regard, monitoring system 118 could automatically maintain the status look-up table up-to-date by, for example, reading the current status of the twenty-four ports of network device 104 every second or so. The JavaScript program simply encodes each set of twenty-four port statuses into a status string of twenty-four characters, with each character representing the state of a corresponding port. Each character string would then be loaded into a look-up table in MID 106.

A typical encoding process will now be described using the port-status examples depicted by sub-images 302 in FIGS. 3 and 4. There are four possible states for each of the twenty-four sub-images numbered 1–24. The four states may be encoded as: state 0=port disabled/no link; state 1=port disabled/link present; state 2=port enabled/no link; and state 3=port enabled/link present. As discussed above, a dark colored (stripped) image corresponds to a disabled port and a light colored image corresponds to an enabled port. A positive sign (+) corresponds to a link present and a negative sign (−) corresponds to no link. Thus, state 0 corresponds to a dark colored (stripped) image with a negative sign (−), such as shown in sub-image 2 in FIG. 3. State 1 corresponds to a dark colored (stripped) image with a positive sign (+), such as shown in sub-image 5 in FIG. 3. State 2 corresponds to a light colored image with a negative sign (−), such as shown in sub-image 3 in FIG. 3. Finally, state 3 corresponds to a light colored image with a positive sign (+), such as shown in sub-image 1 in FIG. 3.

Using the above convention and the status example shown in FIG. 3, the encoded states of the twenty-four Ethernet ports would correspond to the following character string: "302312103030010301321021."On the other hand, the following character string: "303312103031210301321021," would represent the state situation represented in FIG. 4. Each of the twenty-four characters assumes one of only four different values, namely, 0, 1, 2 or 3. From comparison of the two character strings, it can be seen that only the corresponding third, twelfth and thirteenth characters differ.

As explained above, monitoring system 118 would periodically read the state of each port in network device 104 and encode those states into a character string similar to those just described with respect to FIGS. 3–4. In addition, monitoring system 118 loads the character strings into a look-up table in MID 106.

In execute STEP 610, a JavaScript program located in file "EX" would retrieve the most recently encoded character string from MID 106 and return the output data to Web browser 209e as part of update HTML document 630, in send STEP 611. The update document 630 would also contain a function call to update function 513, which was previously loaded into the head of visible frame 207a in render STEP 517.

Web browser 209e loads, in load STEP 612, update document 630 into the head of hidden frame 207b. Web browser 209e then renders update document 630, via render STEP 613. Since update document 630 has no body, there will be nothing for Web browser 209e to display. Thus, in render STEP 613, Web browser 209e need only execute the script located in the head of update document 630, which invokes a function call to update function 513.

When update function 513 executes, in execute STEP 614, it accepts as a parameter the character string, which was part of update document 630, as being a new device status. Using that new device status as a parameter, in update STEP 615, Web browser 209e updates the twenty-four statuses in status sub-images 302. After the update is complete, the process returns to periodic-trigger STEP 606 where the update cycle repeats.

FIG. 7 illustrates the details of a process of updating the states of status sub-images 302 in update STEP 615. In compare STEP 701, Web browser 209e compares the old status to the new status. If, in decision STEP 702, Web browser 209e finds that the old status equals the new status, signifying that there has been no change in the states of the Ethernet ports since the last update, the process exits the "Y" path of STEP 702 and returns to periodic trigger STEP 606. If, however, Web browser 209e finds that the old status does not equal the new status, the process exits the "N" path of STEP 702 and makes a character-by-character comparison to find where the differences occur.

That process begins in STEP 703 by initializing an index "i" to the value one (1), and a constant "n" to the value twenty-four (24). The index "i," which varies from one to twenty-four, points to the twenty-four different sub-images 302. The constant "n" represents the total number of sub-images 302.

In compare STEP 704, Web browser 209e compares the corresponding characters numbered "i" in those character strings representing the new status and the old status. For example, since "i" will initially have a value one (1), the first characters in the new and old status strings are compared. For purposes of illustration, assume that the twenty-four states depicted in FIG. 3 represent an old status, and that those depicted in FIG. 4 represent a corresponding new status as follows:

old status: 302312103030010301321021;
new status: 303312103031210301321021.

Thus, when "i" equals one (1), Web browser 209e will find, in decision STEP 705, that the first characters are both "3" and, therefore, are equal to each other. Thus, the process exits the "Y" path of STEP 705 to decision STEP 706. In decision STEP 706, the index "i" is compared to the constant "n." In the present example, "i" equals one and "n" equals 24. Since at this point "i" does not equal "n," the process exits the "N" path of STEP 706 to increment STEP 707, where "i" is set equal to "i+1." With "i" now equal to two (2), the corresponding second characters are compared, in compare STEP 704. Since the second characters both equal "0," the process advances to increment step 707 via the "Y" path of STEP 705 and the "N" path of STEP 706. Index "i" is now incremented to three (3) in STEP 707, causing comparison of the corresponding third characters, in compare STEP 704. Since the corresponding third characters are unequal (the old equals two and the new equals three), the process will exit the "N" path of decision STEP 705. Next, the Web browser 209e proceeds to a process of replacing the image of the third status sub-image, i.e., the sub-image numbered 3 in FIGS. 3–4, to reflect the new state of the corresponding Ethernet port. Specifically, Web browser 209e replaces the negative sign (−) in the third status-sub-image 302 with a positive sign (+) (see FIGS. 3–4).

To effect this change, Web browser 209e in change STEP 710 first changes the source (SRC) attribute for status sub-image "i," where "i" equals three (3). Specifically, assume that the SRC attribute has the following format:

http://<ip address>/<directory path>/<name>-<state>.gif where:

<ip address> is the Internet protocol address of monitoring system 118;

<directory path> is a path to the image's directory in MID 106;

<name> is an arbitrary symbolic or descriptive name of a particular image;

<state> is a numeric code representing a discrete state; and gif is a file extension that identifies a particular commercial bit map image format.

Since, in the present case, only the state of the image has changed, only the numeric code corresponding to the state in SRC attribute needs to be changed. With respect to the corresponding third characters, the old state is represented by the character "2" and the new state is represented by the character "3." Consequently, the corresponding SRC attributes are as follows:

Old SRC attribute:

http://<ip address>/<directory path>/<name>-<2>.gif

New SRC attribute:

http://<ip address>/<directory path>/<name>-<3>.gif.

Web browser 209e now retrieves the appropriate image data for updating the corresponding third sub-image 302 in mimic 140. Using the new SRC attribute (shown above) in retrieve STEP 711, Web browser 209e first looks in a cache memory to see if the corresponding image data had recently been downloaded from the network so that the image data can be redisplayed quickly in update STEP 712. If the appropriate image data is not located in cache memory, web browser 209e accesses the appropriate image data from monitoring system 118. In either case, Web browser 209e uses the new SRC attribute to obtain the image data corresponding to the new state. In the present example, Web browser 209e, in update STEP 712, displays the new image (a light color with a positive sign) for the third status sub-image 302 to reflect the new state of the corresponding Ethernet port.

The process then proceeds to decision STEP 706, where index "i" is compared to constant "n." The process continues as described above, changing only those status sub-images 302 that have a new state. In the present example, in addition to changing the third status sub-image, status sub-images 12 and 13 will be the only other sub-images that need to be changed. Finally, when Web browser 209e finds "i" to be equal to 24 in decision STEP 706, the process exits the "Y" path, thereby returning to periodic trigger STEP 606.

While the process of updating a displayed mimic has generally been described as being performed in response to an update request generated by management system 102, it is to be understood that such updates may be initiated by monitoring system 118. Indeed, those update requests that monitoring system 118 initiates may take place only when an actual change in state of an Ethernet port occurs. For example, after the initial generation and display of device mimic 140, management system 102 may generate a hidden frame of the type discussed above and transmit it each time the monitoring system detects that a change in the state of the monitored device has occurred. Management system 102 would update the displayed mimic 140 in the manner discussed above when responding to the reception of a hidden frame that included a set of device state information and an appropriate JavaScript program. In addition, it is to be understood that device mimic 140 can be output to a printer in addition to, or instead of, being displayed on display device 134. Obviously many other modifications and variations of the present invention are possible in the light of the above teachings. It is therefore to be understood, that within the scope of the appended claims, the invention may be practiced otherwise than as specifically described.

What is claimed is:

1. A method of periodically displaying the most recently detected status of a monitored device using a monitoring system communicating with a computer via a network, the method comprising the steps of:

storing, in said monitoring system, data and programs for generating a mimic comprising predetermined fixed images, and predetermined variable images that represent status features of said monitored device;

executing said programs in said monitoring system for generating and transmitting a mimic document to said computer;

said computer using said mimic document to render said mimic;

said mimic periodically transmitting an update request to said monitoring system, said update request asking for the most recently detected status of said monitored device;

said monitoring system, in response to receiving said update request, transmitting to said computer an update document comprising an update program and update data representing the most recently detected states of all of said status features;

said computer executing said update program and said update data to determine which of said status features of said monitored device have states that differ from the corresponding current states of said variable images in said mimic;

said mimic retrieving a new image only for each of said variable images that need to be updated; and said mimic rendering said new images in place of corresponding variable images while leaving the remainder of said mimic in its current state.

2. The method of claim 1, wherein the step of executing said programs to transmit a mimic document include transmitting an HTML file.

3. The method of claim 2, wherein said computer uses said HTM file to render said mimic in a WEB browser.

4. The method of claim 1, wherein said computer renders said mimic by requesting corresponding image files from said monitoring system.

5. The method of claim 3, wherein the step of retrieving a new image includes searching a cache memory in said computer for a previously downloaded copy of said new image.

6. The method of claim 5, wherein the step of retrieving a new image includes requesting a copy of said new image from said monitoring system if said cache memory does not contain a previously downloaded copy of said new image.

7. The method of claim 3, wherein said update program includes a JavaScript routine.

8. The method of claim 7, wherein said JavaScript routine is part of a hidden HTML update file.

9. The method of claim 8, wherein said update program includes a JavaScript polling routine for controlling the computer to initiate said update request.

10. A computer system for periodically displaying the status of a monitored device comprising:

a monitoring system having means for detecting the status of said monitored device;

a computer having a display;

a network linking said computer with said monitoring system;

data and programs, stored in said monitoring system, for generating a mimic comprising fixed images, and variable images that represent the state of status features of said monitored device;

execute means in said monitoring system for executing said programs to generate mimic documents in response to receiving a mimic request from said computer;

said computer having means for retrieving said mimic documents from said monitoring system and for using said mimic documents to render said mimic on said display;

polling means located in said mimic for causing said computer to periodically transmit an update request to said monitoring system asking for an update of the most recently detected status of said monitored device;

said monitoring system having an update means that, in response to receiving said update request, transmits to said computer an update document comprising an update program and update data representing the most recently detected states of said status features; and said computer having means for executing said update program and said update data to determine which of said most recently detected states of said status features differ from the corresponding current states of said variable images, retrieving a new image only for each of said variable images having a current state that differs from the state of its corresponding status feature, and rendering said new images in place of the corresponding current variable images while maintaining said fixed images and variable images in the remainder of said mimic in their current states.

11. The system of claim 10, wherein said programs for generating a mimic include means for transmitting an HTML file.

12. The system of claim 11, wherein said HTM file includes means for rendering said mimic in a WEB browser.

13. The system of claim 10, wherein said means for retrieving a new image includes means for retrieving said new images from said monitoring system.

14. The system of claim 10, wherein said means for retrieving a new image includes means for searching a cache memory in said computer for a previously downloaded copy of said new image.

15. The system of claim 14, wherein said means for retrieving a new image includes means for requesting a copy of said new image from said monitoring system if said cache memory does not contain a previously downloaded copy of said new image.

16. The system of claim 12, wherein said update program includes a JavaScript routine.

17. The system of claim 16, wherein said JavaScript routine is part of a hidden HTML update file.

18. The system of claim 17, wherein said polling means includes a JavaScript routine.

* * * * *